Patented May 27, 1930

1,760,806

UNITED STATES PATENT OFFICE

HERMANN BERTHOLD, OF LEVERKUSEN-ON-THE-RHINE, GERMANY, ASSIGNOR TO GENERAL ANILINE WORKS, INC., OF NEW YORK, N. Y., A CORPORATION OF DELAWARE

β-MERCAPTO-PROPIONIC ACID ANTHRAQUINONE DYE

No Drawing. Application filed December 16, 1927, Serial No. 240,641, and in Germany December 18, 1926.

The present invention concerns sulfur containing dyestuffs of the anthraquinone series. They can be obtained by subjecting mercaptans of the anthraquinone series to the action of halogen substituted higher homologues of acetic acid. The new sulfur dyestuffs dye esters and ethers of cellulose or the conversion products thereof e. g. hydrocellulose very intense golden yellow shades, which are very fast.

The new products are in the form of their alkali metal salts after being dried and pulverized generally colored powders soluble in water. In the free state they have most probably the following formula:

wherein R stands for an anthraquinone radicle which may be substituted, $R_1$ stands for an alkylene radical containing at least two carbon atoms e. g.

$-CH_2-CH_2-$, $-CH_2-CH_2-CH_2-$, etc.

The following examples will illustrate my invention:

Example 1.—1 part by weight of anthraquinone-1-mercaptan and 20 parts by weight of 5% alcoholic caustic potash are heated together until a solution of 1-anthraquinone-potassium-mercaptide is obtained, which is decomposed by heating for a short time at the boiling point with an alkaline solution of β-chloro-proprionic acid, until the formation of the potassium salt of anthraquinonyl-β-mercapto-propionic acid occurs having the formula:

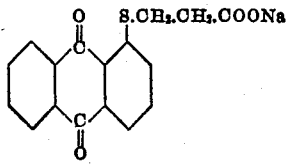

which is ascertained by the accompanying color change. After filtration and acidification, the dyestuff separates as a yellow, flocculent precipitate.

For dyeing, one gram of the sodium salt is made into a paste with 1 gram of Marseille soap, using water free from $CaCO_3$ and the paste is stirred into 1 liter water containing 2-3 grams of Marseille soap. 30 grams of cellulose acetate silk are dyed in this bath. A golden-yellow shade is obtained.

Example 2.—5-chloro-1-anthraquinonyl-β-mercaptopropionic acid is obtained from 5-chloro-anthraquinone-1-mercaptan in a similar manner according to that described in Example 1. This dyestuff dyes cellulose acetate silk yellow.

Example 3.—4-amino-1-anthraquinonyl-β-mercaptopropionic acid is obtained from 1-amino-anthraquinone-4-mercaptan as described in the previous example; the dyestuffs dyes cellulose acetate silk in blueish-rose shades.

I claim:

1. The products having in their free form the probable formula:

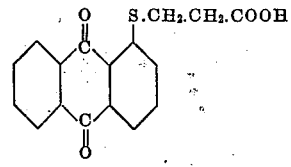

wherein the anthraquinone nucleus may be further substituted, said products being in form of their alkali metal salts colored powders, soluble in water, dyeing cellulose acetate silk strong and fast shades.

2. The product having in its free form the probable formula:

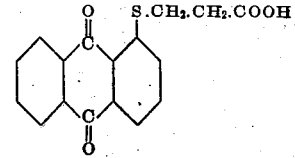

said product being in form of its sodium salt a yellow compound, yielding on cellulose acetate silk a strong and fast golden yellow shade.

3. Cellulose acetate silk dyed with a dyestuff of claim 1.

4. Cellulose acetate silk dyed with the dyestuff of claim 2.

In testimony whereof I have hereunto set my hand.

HERMANN BERTHOLD.